Aug. 28, 1923.

H. A. WEIDAW 1,466,009

TIRE TUBING MACHINE

Filed Sept. 29, 1922  3 Sheets-Sheet 2

H. A. Weidaw
INVENTOR

BY Victor J. Evans
ATTORNEY

WITNESS:

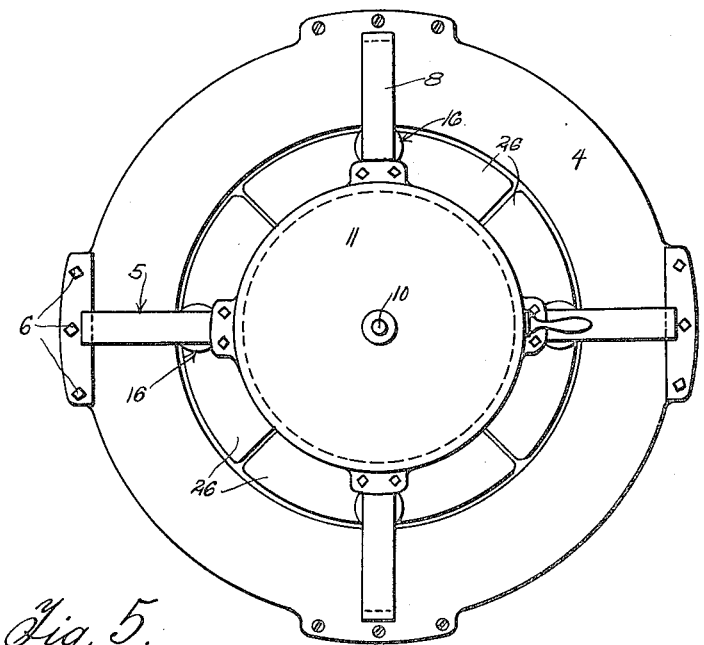
Fig. 5.
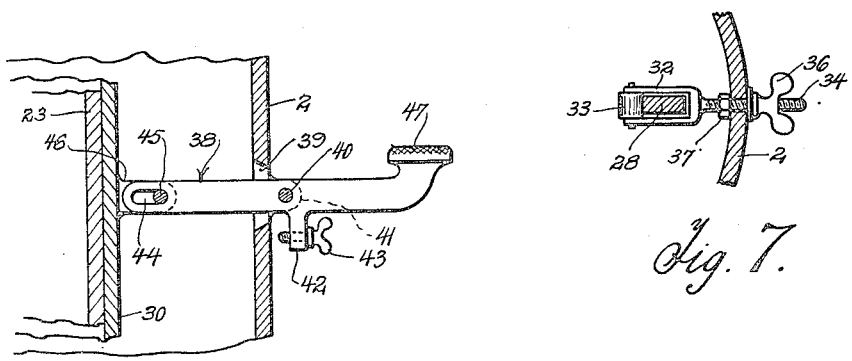
Fig. 6.
Fig. 7.

Patented Aug. 28, 1923.

1,466,009

UNITED STATES PATENT OFFICE.

HARRY ABSOLAM WEIDAW, OF AKRON, OHIO.

TIRE-TUBING MACHINE.

Application filed September 29, 1922. Serial No. 591,368.

*To all whom it may concern:*

Be it known that I, HARRY A. WEIDAW, a citizen of the United States, residing at Akron, in the county of Summit and State of Ohio, have invented new and useful Improvements in Tire-Tubing Machines, of which the following is a specification.

This invention relates to machines for assisting in placing tubes in tire casings, and more particularly to what I term a tire tubing machine.

One of the main objects of the invention is to provide a machine of simple construction and operation specially adapted for use in automobile tire factories and similar places where it is necessary to insert tubes into tire casings in large quantities. A further object is to provide a machine which may be readily operated by one person and which serves to effectually hold the tire casing open so as to permit ready entry of the tube, when inflated, into the casing. Further objects will appear from the detailed description.

In the drawings:—

Figure 5 is a top plan view of the machine.

Figure 6 is a section taken substantially on line 6—6 of Figure 4.

Figure 7 is a section taken substantially on line 7—7 of Figure 1.

Figure 1:
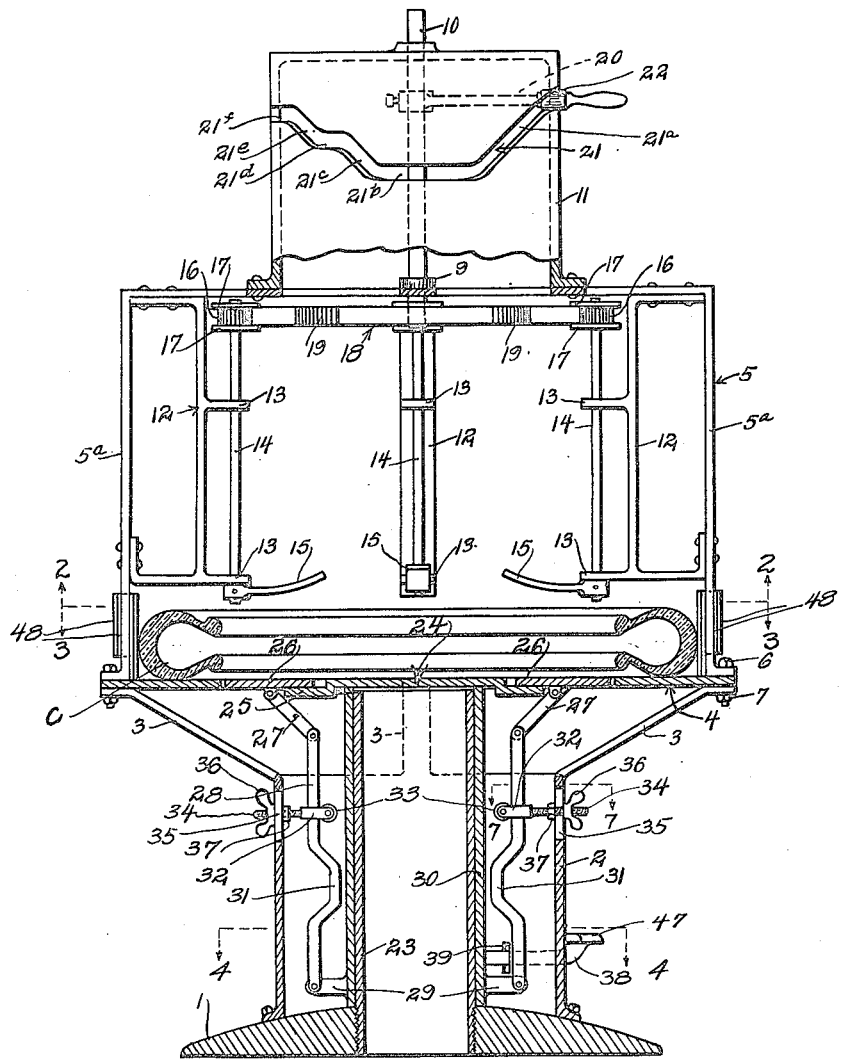
Figure 1 is a central vertical transverse section through the machine.
Figure 2:
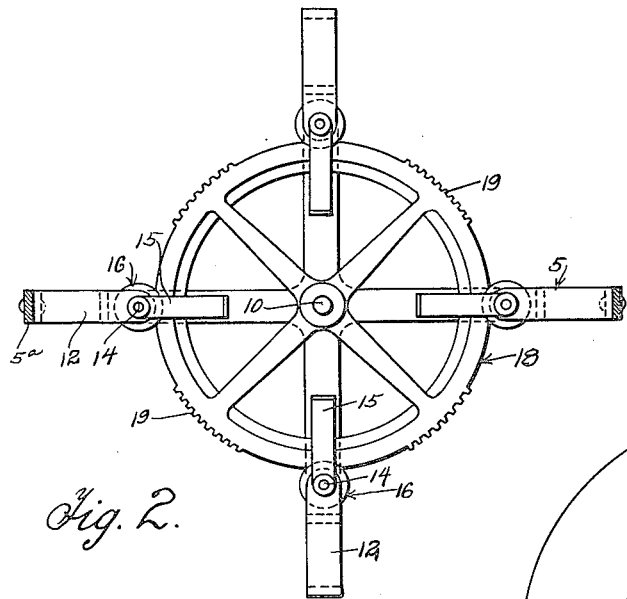
Figure 2 is a section taken substantially on line 2—2 of Figure 1.
Figure 4:
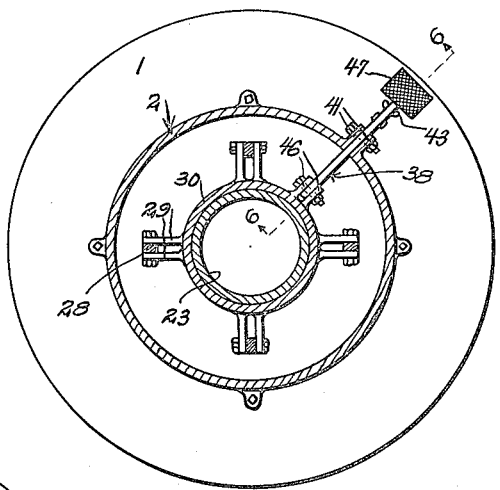
Figure 4 is a section taken substantially on line 4—4 of Figure 1.
Figure 3:
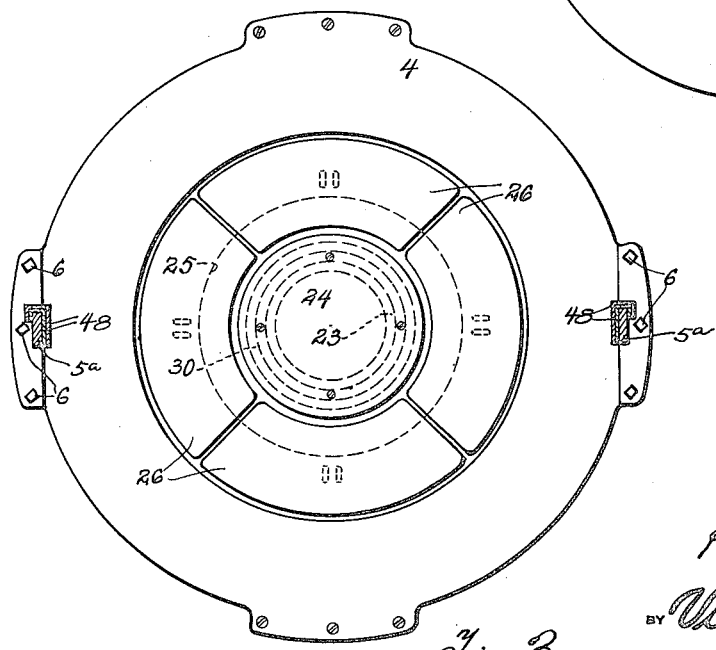
Figure 3 is a section taken substantially on line 3—3 of Figure 1.

In constructing the machine I provide a heavy base 1 to which is secured a cylindrical column 2 provided at its upper end with upwardly and outwardly diverging arms 3 which support an annular plate or table 4. An inverted U-shaped frame 5 is secured, at the lower end of each end arm, by bolts 6 and nuts 7, to table 4, this frame extending diametrically of the table and the bolts and nuts 6 and 7 serving to secure two of the arms 3 to the table. Frame 5 is provided with two rectangular or L-shaped arms 8 extending from and disposed at right angles to the bight portion of frame 5. At the juncture of arms 8 with the bight portion of frame 5 there is provided a collar 9 through which is slidably and rotatably mounted a shaft 10, this shaft being also slidably and rotatably mounted through the top of a cylinder 11 secured to arms 8 and the bight portion of frame 5.

Brackets 12 are secured on the vertical arms 5ª of frame 5, and each bracket is provided with a pair of inwardly projecting lugs 13. Similar brackets are secured on the vertical elements 8ª of arms 8. Vertical shafts 14 are rotatably mounted through the lugs 13 of brackets 12 and an upwardly curved finger 15 is secured on the lower end of each shaft. A spur pinion 16 is secured on the upper end of each shaft 14 and is provided with upper and lower annular flanges 17 which are positioned to fit above and beneath an operating disc 18 secured on the lower end of operating shaft 10. Disc 18 is provided with a plurality of gear segments 19 positioned to mesh with pinions 16 so as to impart rotary movement to shafts 14 through a predetermined distance when the shaft 10 has been moved vertically through a predetermined distance. A lever 20 is secured at its inner end on shaft 10 and extends through a slot 21 extending half the circumference of cylinder 11, an antifriction roller 22 being mounted on lever 20 and operating through slot 21. The slot is shaped to provide a downwardly and inwardly inclined portion 21ª, the upper end of which is substantially horizontal, a central horizontal portion 21ᵇ, a lower inclined portion 21ᶜ, a substantially horizontal portion 21ᵈ, and an upper inclined portion 21ᵉ terminating in a substantially horizontal portion 21ᶠ. With the lever 20 in the position illustrated in Figures 1 and 5, shaft 10 is held raised and disc 18 is turned into such position as to bring the segments 19 out of mesh with pinions 16. By moving lever 20 down portion 21ª of slot 21 shaft 10 and disc 18 are lowered thereby permitting lowering of shafts 14 and fingers 15 carried thereby. During lowering of shaft 10 this shaft and disc 18 are turned so as to bring segments 19 adjacent to pinions 16. As the lever is moved through portion 21ᵇ of the slot toward portion 21ᶜ, disc 18 is turned and, during this turning movement of the disc, segments 19 mesh with pinions 16 so as to turn each of the shafts 14 through an arc of approximately 180°. As lever 20 is moved up the inclined portion 21ᵉ of the slot shaft 10 and disc 18 carried thereby are raised, thus raising shafts 14 and fingers 15. During this movement shafts 14 are not rotated as the segments 19 have passed out of mesh with pinions 16. If it is desired to open the casing only a comparatively small distance the lever 20 can be held in adjustment by permitting roller 22 to rest upon the horizontal portion 21ᵈ of the slot. If it is desired to open the casing to the fullest extent, movement of lever 20 is continued up the inclined portion 21ᵉ of the slot, the lever being held in rotary and vertical adjustment by roller 22 resting upon horizontal portion 21ᶠ of the slot.

A post 23 is secured in base 1 centrally thereof and is provided at its upper end with a circular head 24 having a depending radially extending and horizontally disposed flange 25 which provides means for slidably supporting a plurality of circularly arranged and relatively broad segmental plates 26. These plates are supported for movement radially of head 24, for which purpose each plate is connected by a link 27 to the upper end of an operating bar 28 pivoted at its lower end to a lug 29 projecting from a tubular member 30 mounted for sliding movement on post 23. Bar 28 is provided, adjacent to its lower end with an inwardly directed crank element 31, and the bar is slidable through a guide bracket 32 of U-shape, a roller 33 being supported in the inner end of the bracket. Bracket 32 is provided with an outwardly extending screw stem 34 which extends through a slot 35 extending longitudinally of standard 2. A wing nut 36 is threaded on the outer portion of stem 34 and coacts with a nut 37 threaded on the inner portion of stem 34 for securing bracket 32 in adjustment. The threaded stem 34 and the nuts 36 and 37 co-act with the standard 2 for securing the bracket in adjustment radially of the standard, and slot 35 permits the bracket to be adjusted vertically. This provides simple and efficient means whereby universal adjustment can be readily effected of the brackets.

A foot lever 38 extends through a slot 39 in standard 2, this lever being pivoted at 40 between two parallel lugs 41 which project from the standard. Lever 38 is provided with a depending lug 42 through which is threaded a set screw 43 by means of which downward movement of the outer portion of lever 38 can be positively limited. At its inner end lever 38 is provided with a longitudinally extending slot 44 through which extends a pin 45 secured through spaced lugs 46 extending from tubular member 30. By exerting pressure on the knurled head 47 provided at the outer end of lever 38 tubular member 30 is raised, the rods 28 being also raised with this member. During upward movement of tubular member 30 head 24 and plates 26 are raised to such an extent as to bring the plates into a plane slightly above the lower inner portion of tire casing C supported on the annular table 4. After the plates 26 have reached this position continued upward movement of tubular member 30 causes the crank elements 31 of rods or bars 28 to enter guide brackets 32 thus causing an outward movement of the upper ends of the bars which results in moving plates 26 outwardly radially of head 24, these plates being projected into the tire casing C over the lower bead of the casing. This outward movement of plates 26 radially of head 24 also serves to produce, in conjunction with the head, what is in effect an inner circular table the edge portions of which, or plates 26, project into the casing above the lower bead. After this has been done the fingers 15 are lowered and turned so as to project beneath the upper bead of the casing, after which the fingers are then raised in the manner previously described, the fingers 15 and plates 26 co-acting to spread or open the casing. After this has been done the tube, in deflated condition, is placed upon the table formed by head 24 and plates 26 and is then inflated, the inflation of the tube causing it to expand into the casing. After the tube has been expanded into the casing lever 20 is returned to its initial position illustrated in Figure 1 thus withdrawing fingers 15 from the casing and permitting the upper portion of the casing to close, and lever 38 is released so as to permit lowering of member 30 and the parts associated therewith thus withdrawing plates 26 from the casing permitting the casing to close, the tube being properly positioned within the casing. This completes the operation of inserting the tube into the casing, after which the casing and the tube enclosed thereby are removed from the table and replaced by another casing into whch it is desired to insert a tube, the operation above described being repeated. This provides very simple and efficient means whereby tubes may be quickly and easily inserted into tire casings, by a single operator thus effecting a material saving over the present method of inserting tubes. To permit the tire casings to be readily placed upon and removed from table 4, the vertical arms of members 8 of the upper supporting frame 5 terminate above the table a distance sufficient to permit the casing to be readily slid onto and off of the table diametrically thereof beneath the lower ends of the vertical arms of members 8.

To accommodate tires of different diameters suitable shims or filler plates 48 may be provided, which are fitted about the lower portions of the vertical arms 5ᵃ of frame 5, though any other suitable or preferred means for accomplishing this result may be employed.

What I claim is:—

1. In a machine of the character described, a table for supporting a tire casing, a plurality of lower members adapted for engagement over the lower portion of a casing on said table, means for imparting upward and outward movement to said members simultaneously relative to the table, a plurality of upper members adapted for engagement beneath the upper portion of a casing on the table, and means for imparting vertical movement to said members, and for turning said members through a predetermined distance when they have reached a predetermined vertical position.

2. In a machine of the character described, a table for supporting a tire casing, a plurality of circularly arranged plates normally disposed substantially in the plane of the table and remote from the outer edge thereof, means for simultaneously moving said plates upwardly and outwardly of the table to project the plates into the casing over the lower portion thereof, a plurality of fingers above the plates disposed in concentric relation thereto, and means for raising and lowering said fingers and for turning the same when in lowered position so as to project either inwardly or outwardly of the table, optionally.

3. In a machine of the character described, a table for supporting a tire casing, a plurality of relatively broad circularly arranged plates normally disposed substantially in the plane of the table and remote from the outer edge thereof, means for simultaneously moving said plates upwardly and outwardly of the table to project the plates into the casing over the lower portion thereof, a plurality of fingers above the plates disposed in concentric relation thereto, and means for raising and lowering said fingers and for turning the same when in lowered position so as to project either inwardly or outwardly of the table, optionally.

4. In a machine of the character described, a table for supporting a tire casing, a plurality of segmental circularly arranged plates normally disposed substantially in the plane of the table and remote from the outer edge thereof, means for simultaneously moving said plates upwardly and outwardly of the table to project the plates into the casing over the lower portion thereof, a plurality of fingers above the plates disposed in concentric relation thereto, and means for raising and lowering said fingers and for turning the same when in lowered position so as to project either inwardly or outwardly of the table, optionally.

5. In a machine of the character described, a table for supporting a tire casing, a plurality of circularly arranged plates normally positioned substantially in the plane of the table and remote from the outer edge thereof, means for simultaneously moving said plates upwardly and outwardly of the table, a plurality of fingers above the plates and disposed in concentric relation thereto, and means for lowering said fingers and turning them to project outwardly of the table, said means acting to then raise the fingers and to then lower the fingers and turn them to project inwardly of the table and to then raise the fingers into their initial vertical position without further turning movement.

6. In a machine of the character described, a table for supporting a tire casing, a plurality of circularly arranged plates normally positioned substantially in the plane of the table and remote from the outer edge thereof, a plurality of vertical shafts rotatably and slidably mounted above the plates, fingers secured on said shafts, and means for lowering and raising the shafts and for imparting predetermined turning movement to the shafts in opposite directions during alternate lowering and raising thereof.

7. In a machine of the character described, a table for supporting a tire casing, a plurality of circularly arranged plates normally positioned substantially in the plane of the table and remote from the outer edge thereof, a plurality of vertical shafts rotatably and slidably mounted above the plates, fingers secured on the lower portions of the shafts, an operating shaft positioned centrally of the vertical shafts, a disc secured on said operating shaft and having peripheral gear segments, pinions secured on the vertical shafts and positioned to mesh with the gear segments of the disc, means for lowering and raising the operating shaft and simultaneously rotating the same, the gear segments of the disc being positioned to mesh with said pinions when the shaft is in its lowermost position and being of such length as to turn each of the vertical shafts through an arc of approximately 180°, and means for raising and lowering the vertical shafts simultaneously with and similarly to raising and lowering of the disc.

8. In a machine of the character described, a table for supporting a tire casing, a plurality of circularly arranged plates normally positioned substantially in the plane of the table and remote from the outer edge thereof, a plurality of vertical shafts rotatably and slidably supported above said plates, fingers secured on the lower ends of said shafts, a casing supported above said vertical shafts, an operating shaft slidably and rotatably mounted through the casing, a disc secured on the lower end of the operating shaft, said casing being provided with a tortuous slot extending circumferentially thereof, pinions secured on the vertical shafts and having flanges engaging about the disc for causing vertical movement of the vertical shafts with said disc, said disc being provided with gear segments disposed to mesh with said pinions when the disc is turned into a predetermined position, and an operating lever secured on the operating shaft and projecting through said slot for imparting simultaneous turning and vertical movements to the shaft by movement of the lever lengthwise of the slot.

9. In a machine of the character described, a table for supporting a tire casing, a plurality of upper members adapted for engagement into a casing supported by said table, means for lowering and raising said members and for turning them into and out of the casing, a tubular member mounted for vertical movement, a head on the upper end of said tubular member, a plurality of circularly arranged plates carried by said head and movable radially thereof, and means for raising said tubular member and for moving the plates outwardly of the head to project said plates into the casing, when the tubular member has been raised a predetermined distance.

10. In a machine of the character described, an annular table, a plurality of upper members adapted for engaging into a casing supported by said table, means for lowering and raising said members and for turning them into and out of the casing, a tubular member disposed centrally of the table and mounted for vertical movement, a head on the upper end of said member, a plurality of plates mounted on said head for movement radially thereof, means for raising said tubular member, and means for projecting the plates outwardly of the head when the tubular member is raised a predetermined distance, and for returning the plates to their initial positions when said tubular member is lowered.

11. In a machine of the character described, an annular table, a plurality of upper members adapted for engagement into a casing supported by said table, means for lowering and raising said members and for turning them into and out of the casing, a tubular member disposed centrally of the table and mounted for vertical movement, a head on the upper end of said member, a plurality of plates mounted on said head for movement radially thereof, means for raising said tubular member, and means for projecting the plates outwardly of the head when the tubular member is raised a predetermined distance, and for returning the plates to their initial positions when said tubular member is lowered, said projecting means being adjustable to vary the point in raising of the tubular member at which said plates are projected.

12. In a machine of the character described, a base, an outer standard secured to said base, an annular table supported by said standard, a central post secured to the base, a tubular member slidable on the post, a head on the upper end of said tubular member, a plurality of circularly arranged plates supported on said head for movement radially thereof, means for raising the tubular member, means for projecting said plates when the tubular member is raised a predetermined distance, a plurality of upper members supported above the table for vertical movement and adapted for engagement into a tire casing supported on the table, and means for raising said upper members.

13. In a machine of the character described, a base, an outer standard secured to said base, an annular table supported by said standard, a central post secured to the base, a tubular member slidable on the post, a head on the upper end of said tubular member, a plurality of circularly arranged plates supported on said head for movement radially thereof, means for raising the tubular member, guide brackets mounted on the standard and adjustable radially and vertically thereof, bars passing snugly through said brackets and pivotally connected at their lower ends to the tubular member, each bar being provided with an inwardly directed crank element remote from the upper end of the bar, links connecting the respective plates to the upper ends of the respective bars, upper members supported above the plates for vertical movement and adapted for engagement into a tire casing supported on the table, and means for raising said upper members.

In testimony whereof I affix my signature.

HARRY ABSOLAM WEIDAW.